United States Patent
Sewell

(10) Patent No.: US 8,485,287 B2
(45) Date of Patent: Jul. 16, 2013

(54) COMPACT TOOL CARRIER WITH ARTICULATION JOINT

(75) Inventor: Cody L. Sewell, Perry, OK (US)

(73) Assignee: The Charles Machine Works, Inc., Perry, OK (US)

(*) Notice: Subject to any disclaimer, the term of this patent is extended or adjusted under 35 U.S.C. 154(b) by 1571 days.

(21) Appl. No.: 11/610,428

(22) Filed: Dec. 13, 2006

(65) Prior Publication Data
US 2007/0132204 A1    Jun. 14, 2007

Related U.S. Application Data

(60) Provisional application No. 60/750,419, filed on Dec. 13, 2005.

(51) Int. Cl.
*B62D 55/00*    (2006.01)

(52) U.S. Cl.
USPC ........... 180/9.22; 180/9.23; 180/6.64; 37/352

(58) Field of Classification Search
USPC ..................... 180/6.64, 9.22, 9.23; 37/352
See application file for complete search history.

(56) References Cited

U.S. PATENT DOCUMENTS

| | | | | |
|---|---|---|---|---|
| 3,771,241 | A * | 11/1973 | Lindell et al. | 37/352 |
| 4,222,186 | A | 9/1980 | Molby | |
| 4,277,898 | A * | 7/1981 | Flippin | 37/348 |
| 4,483,084 | A * | 11/1984 | Caldwell et al. | 37/349 |
| 4,833,797 | A * | 5/1989 | Slunecka et al. | 37/352 |
| 4,974,348 | A * | 12/1990 | Wallace | 37/465 |
| 5,533,587 | A | 7/1996 | Dow et al. | |
| 6,151,811 | A | 11/2000 | Barreto | |
| 6,397,967 | B1 | 6/2002 | McIlwraith | |
| 6,437,701 | B1 | 8/2002 | Muller | |
| 6,516,545 | B2 * | 2/2003 | Jenkins, Jr. | 37/362 |
| 6,658,768 | B1 * | 12/2003 | Bainter | 37/352 |
| 6,715,579 | B1 | 4/2004 | Hendron | |

(Continued)

FOREIGN PATENT DOCUMENTS

| | | |
|---|---|---|
| JP | 2004-359168 A1 | 12/2004 |
| KR | 10-1997-0011209 A1 | 3/1997 |

OTHER PUBLICATIONS

Burkeen Manufacturing Company, "TP16 Trencher-Plow", brochure, Olive Branch, Mississippi.

(Continued)

*Primary Examiner* — Tashiana Adams
*Assistant Examiner* — Marlon Arce
(74) *Attorney, Agent, or Firm* — Tomlinson Rust McKinstry Grable

(57) ABSTRACT

A stand-up, ride-on work vehicle adapted for multiple applications. The vehicle comprises a base unit, an articulating joint, and one of a plurality of interchangeable equipment chassis. The base unit has at least one ground supporting member, and provides power and mobility to the work vehicle. The articulation joint is supported on a front end of the base unit. An operator station extends from a back end of the base unit. Each of the plurality of chassis comprises at least one ground support member and is pivotally connected to the base unit by the articulation joint. Each of the plurality of chassis may be a dedicated equipment chassis or a universal equipment chassis. Each dedicated chassis comprises a dedicated work tool. Each universal chassis comprises an attachment surface for connection to one of a plurality of work tools. The ground supporting members may be any combination of drive wheels, trail wheels, tracks, or work tools.

12 Claims, 14 Drawing Sheets

U.S. PATENT DOCUMENTS

| | | | |
|---|---|---|---|
| 6,830,111 B2 | 12/2004 | Page | |
| 6,997,667 B2 | 2/2006 | Hackett | |
| D579,464 S * | 10/2008 | Sewell et al. | D15/22 |
| 2002/0102154 A1 | 8/2002 | Muller et al. | |
| 2003/0095857 A1* | 5/2003 | Degelman | 414/685 |
| 2003/0221399 A1 | 12/2003 | Hall | |

OTHER PUBLICATIONS

Burkeen Equipment & Supply Company, Walk Behind Trencher/Plow, advertisement, 1981, Memphis Tennessee.

Davis, "Davis Fleetline 12+2", brochure.

* cited by examiner

COMPACT TOOL CARRIER WITH ARTICULATION JOINT

CROSS REFERENCE TO RELATED APPLICATIONS

This application claims priority of U.S. Provisional Patent Application No. 60/750,419, filed Dec. 13, 2005, the contents of which are incorporated fully herein by reference.

FIELD OF THE INVENTION

The present invention relates to the field of outdoor equipment machines and more particularly to stand-up, ride-on articulated construction equipment.

SUMMARY OF THE INVENTION

One aspect of the present invention is directed to a work vehicle. The work vehicle comprises a base unit, a chassis, and a trencher assembly. The base unit has a first and second end, and comprises a platform and a plurality of ground drive members. The platform extends from the first end of the base unit, and is adapted to support a standing operator. The ground drive members are positioned between the platform and the second end of the base unit. The chassis comprises at least one ground support member and is pivotally connected to the second end of the base unit. The chassis is pivotal about a substantially vertical axis. The trencher assembly comprises a trencher boom and is operatively connected to the chassis. The trencher boom is adapted to pivot about a substantially horizontal axis.

Another aspect of the present invention is directed to an articulated work vehicle. The work vehicle comprises a base unit, an operator station, an articulation joint, and an equipment chassis. The base unit has a front and back end, and comprises a power unit and at least one ground drive member. The power unit is adapted to power the work vehicle. The ground drive member is powered by the power unit and adapted to provide mobility to the work vehicle. The operator station extends from the back end of the base unit, and is adapted to allow operation of the vehicle while walking behind or standing on the vehicle. The articulation joint comprises a work attachment plate and a pivot attachment. The pivot attachment is operatively connected to the front end of the base unit such that the articulation joint is pivotally connected about a substantially vertical axis to the base unit. The equipment chassis is removably attachable to the work attachment plate of the articulation joint. The equipment chassis comprises at least one ground support member. The ground support member is adapted to provide mobility and support to the equipment chassis and the base unit.

Yet another aspect of the present invention is directed to a base unit adapted for connection to an equipment chassis. The equipment chassis comprises at least one ground support member adapted to provide mobility and support to the base unit and the equipment chassis. The base unit comprises a stand-on operating platform, at least one ground drive member, and an articulation joint. The operating platform extends from a first end of the base unit. The ground drive member is adapted to provide support and mobility to the base unit. The articulation joint comprises a work attachment plate and a pivot attachment. The pivot attachment is operatively connected to a second end of the base unit such that the articulation joint is pivotally connected about a substantially vertical axis to the base unit. The work attachment plate is adapted for attachment to the equipment chassis.

DETAILED DESCRIPTION OF THE INVENTION

Figure 1:
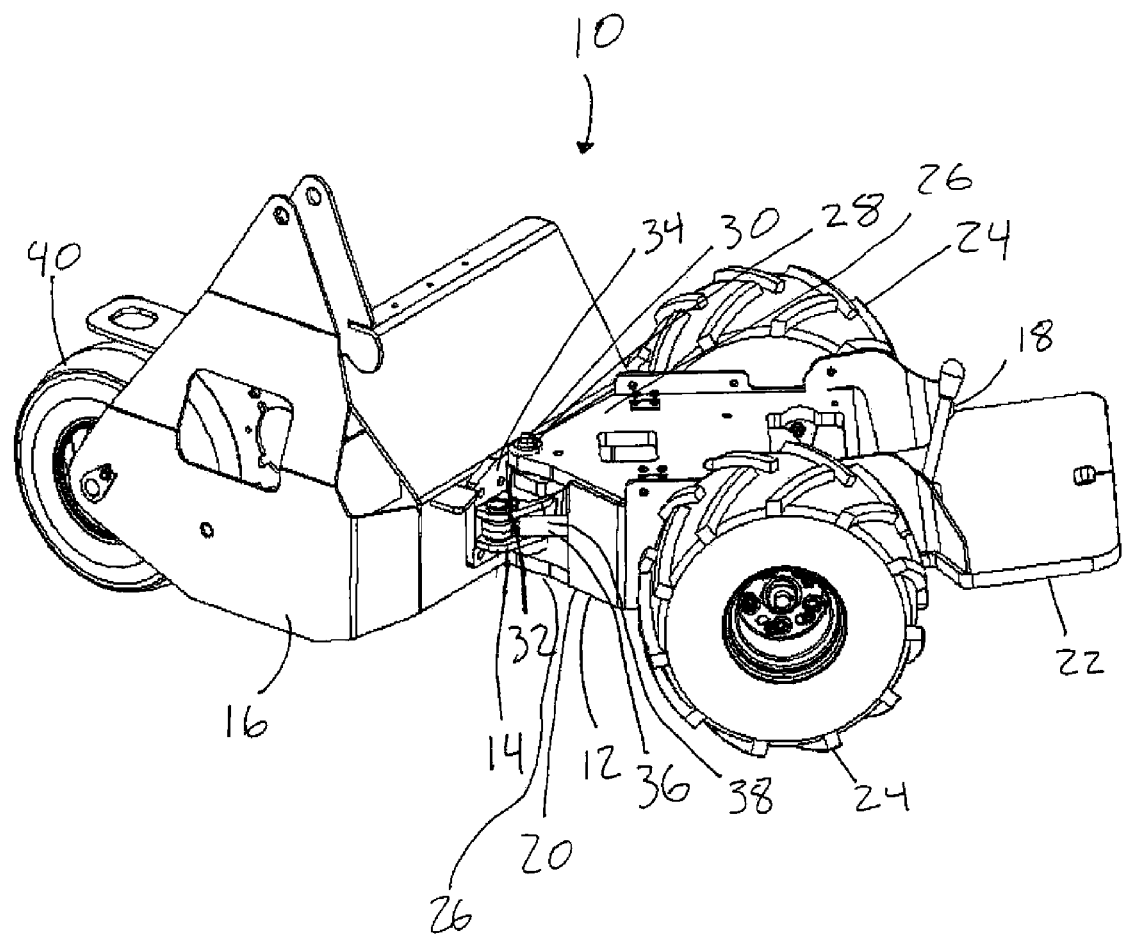
FIG. 1 is a cut-away perspective view of a substructure of a tool carrier comprising a base unit, an articulation joint, and one of a plurality of interchangeable equipment chassis in accordance with the present invention.

Turning now to the drawings in general and FIG. 1 in particular, there is shown a basic structure of an articulated tool carrier in accordance with the present invention. The tool carrier, or work vehicle, designated by reference numeral 10, comprises a base unit 12 (shown herein as a substructure for illustrative purposes), an articulation joint 14, and one of a plurality of equipment chassis 16. The articulation joint 14 pivotally connects the base unit 12 to the equipment chassis 16.

The base unit 12 has a first end 18 and second end 20. The base unit 12 comprises an operator platform 22, a plurality of ground drive members 24, and at least one pivot plate 26. The platform 22 is positioned at and extends from the first end 18 of the base unit 12 proximate the ground drive members 24. The platform 22 provides support for an operator to stand on and operate the tool carrier 10 in a manner yet to be described. The ground drive members 24 are adapted to provide mobility to the tool carrier 10. Preferably, the ground drive members 24 comprise any combination of wheels or tracks. At least one pivot plate 26 is positioned at and extends from the second end 20 of the base unit 12. The pivot plate 26 is adapted to provide a point for the base unit 12 to connect to the articulation joint 14. Preferably, there are two pivot plates 26 for added structural integrity. A pin receptor 28 in the pivot plates 26 provide a pivot point in a vertical plane.

The articulation joint 14 comprises a pivot pin 30, a pin receptor 32, an attachment plate 34, and a steering assembly 36. The pivot pin 30 may be inserted through the pin receptor 28 of the base unit 12 and an aperture of the articulation joint 14. The pivot pin 30 facilitates the connection of the base unit 12 and the articulation joint 14 and provides a pivot point about a substantially vertical axis formed by the pin. The attachment plate 34 provides a connection point for the equipment chassis 16. The attachment plate 34 is preferably configured for quick attachment and removal of the equipment chassis 16.

The articulation joint 14 may be pivoted relative to the base unit 12 through the operation of the steering assembly 36. Preferably, the steering assembly 36 comprises a hydraulic steering cylinder 38, although other steering means are contemplated. The steering cylinder 38 has a first end secured to the articulation joint 14 and a second end securable to the base unit 12. Extension and retraction of the cylinder 38 would cause the attachment plate 34 to pivot relative to the base unit 12. This allows the tool carrier 10 to be pivoted about a centrally located vertical axis for closely coupled steering. Alternatively, the articulation steering method may be used in coordination with other forms of steering, such as skid steering, rear-wheel steering, front-wheel steering, attachment assist steering, etc. Additionally, the articulation joint 14 may oscillate about a longitudinal axis generally parallel to the direction of travel. Said oscillation would provide for improved ground following ability.

The equipment chassis 16 is connectable to the attachment plate 34 of the articulation joint 14. The chassis 16 is preferably adapted for quick and removable attachment to the attachment plate 34. Alternatively, it may be secured with common fasteners. The chassis 16 comprises at least one ground support member 40. The ground support member 40 may be a non-powered trail wheel or powered drive wheel(s) or tracks to provide for enhanced movement. Alternatively, the ground support member 40 may be a work tool as is yet to be described. The chassis 16 may also comprise one or more of various work tools as yet to be described. Preferably, the chassis 16 may also be interchangeable with other chassis having alternative work tools or uses. A resulting wheel base of the tool carrier 10 and tread width of the ground support members 40 of the chassis 16 may be of varying dimensions to optimize the function and the stability of the total vehicle as a function of the installed work tool configuration.

Figure 2:
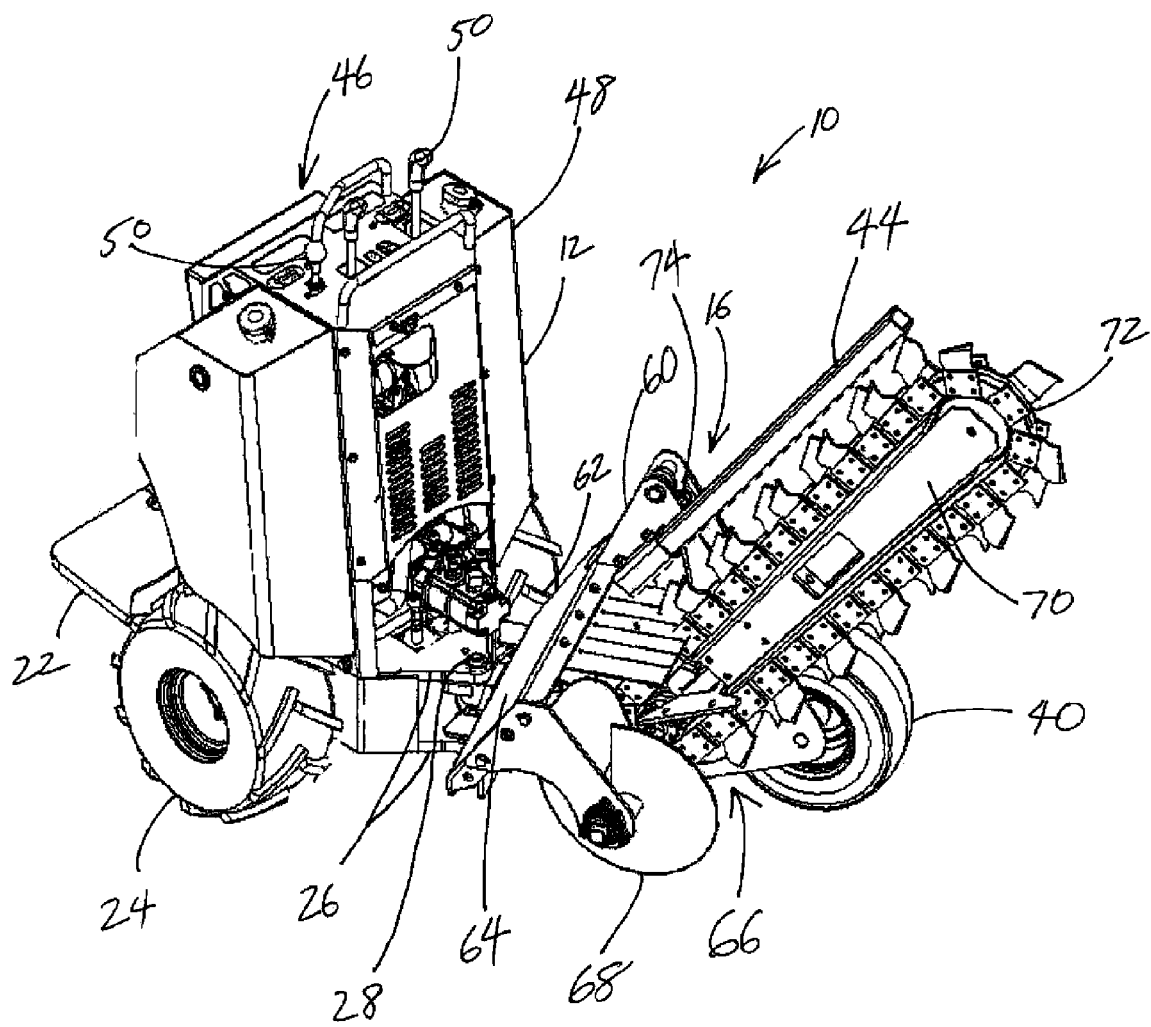
FIG. 2 is a perspective view of a tool carrier comprising a trencher assembly.

With reference now to FIG. 2, there is shown therein an embodiment of the tool carrier machine 10 where the equipment chassis 16 comprises a trencher assembly 44. The base unit 12 comprises an operating station 46, the at least one ground drive member 24, and an engine compartment 48. The operating station 46 comprises the platform 22 and controls 50. The platform 22 is substantially centered on and extends from the first end 18 of the base unit 12. The platform 22 is adapted to allow an operator to stand on the tool carrier 10 and operate the controls 50 with an unimpeded view of the chassis 16 and any work tool. The weight of the operator on the platform 22 improves the traction between each ground drive member 24 and the ground. In an alternative embodiment, all or a portion of the functions of the controls 50 could be accomplished with a tethered or remote control system, to allow the operator to control the tool carrier 10 remotely. Alternatively, the operating station 46 could be adapted to allow an operator to walk behind or to the side of the tool carrier 10.

The ground drive members 24 are adapted to provide tractive mobility to the tool carrier 10 and more specifically, to the base unit section 12. In the preferred embodiment shown in FIG. 2, the base unit 12 comprises two ground drive members 24. As shown, the two ground drive members 24 are wheels, preferably with rubber tires.

Figure 3:
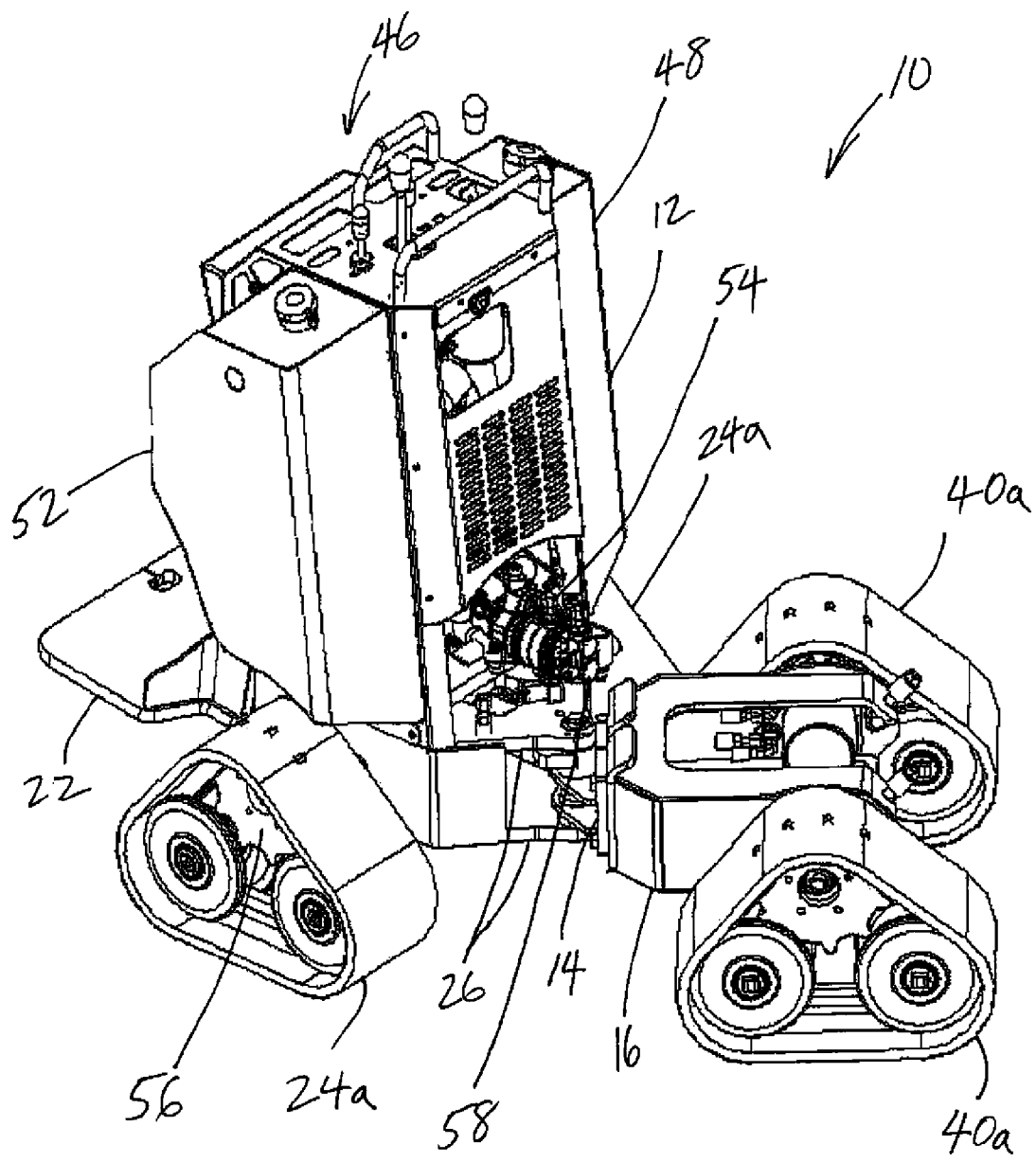
FIG. 3 is a perspective view of a tracked tool carrier with a universal equipment chassis.
Figure 4:
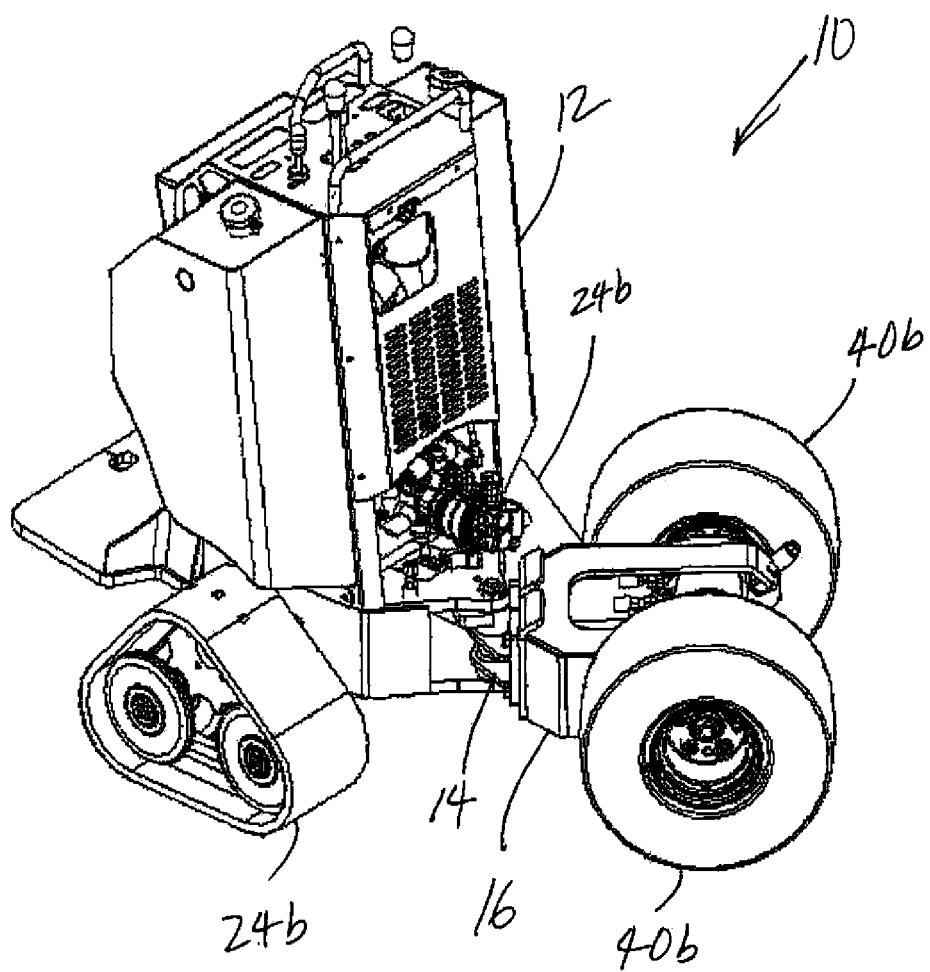
FIG. 4 is a perspective view of the tool carrier of FIG. 3 with tires on the equipment chassis.

Alternatively, as shown in FIG. 3, the ground drive members 24a, and the ground support member 40a may be rubber or steel tracks or any other mechanism used for translating vehicles across the ground. All ground drive members 24a and ground support members 40a disclosed could be a combination of wheels or tracks, powered or non-powered. For example, FIG. 4 shows a tool carrier 10 with a combination of tracks 24b and wheels 40b. As shown, the addition of the tracks 24b to the base unit 12 provides added stability to the base unit if it must be operated without attachment to the chassis 16. Other means of stabilizing the base unit 12 to accommodate movement to hook up or engage the chassis 16 include use of a temporary ground contacting stabilizing member such as a wheel or skid. The temporary member (not shown) may be removable from the base unit 12 or retractably stored when not in use.

Turning again to FIG. 3, the engine compartment 48 comprises an engine enclosure 52, an engine 54, or power unit, at least one ground drive member drive motor 56 and a base unit power connection 58. As shown, the power connection 58 is a hydraulic pump, but alternatively it could be an electrical or air power system driven by the engine 54, on board batteries or an external power source. The engine enclosure 52 protects the engine 54 from damage due to external forces, and provides a barrier between the engine and the operator or bystanders. The engine 54 is adapted to provide power to the various mechanical and hydraulic components of the tool carrier 10. The base unit power connection 58 allows the power provided by the engine 54 to power operative parts of the chassis 16, with known hydraulic and electric connections (not shown) to the chassis. The steering assembly 36 is also powered by the power connection 58 and controlled by the operator with the controls 50.

The ground drive member drive motor 56 is adapted to use power from the engine 54 to operate at least one of the ground drive members 24a. Preferably, each ground drive member 24a has an individual motor 56. One skilled in the art will appreciate that this will allow translation of the base unit 12 without the use of an axle. Further, the lack of an axle will allow the engine 54 to be placed lower in the engine compartment 48, lowering the center of gravity of the base unit 12 without increasing tread width.

Individual wheel motors 56 also provide for variations of hydraulic circuitry in the present invention. The drive motors 56 can be selectively placed in series or parallel circuitry for varied speed and torque capabilities. Additionally, the hydraulic circuit can be arranged to provide for locking of the individual wheel motors 56 in one direction and in a non-locked position to provide for independent operation.

Figure 5:
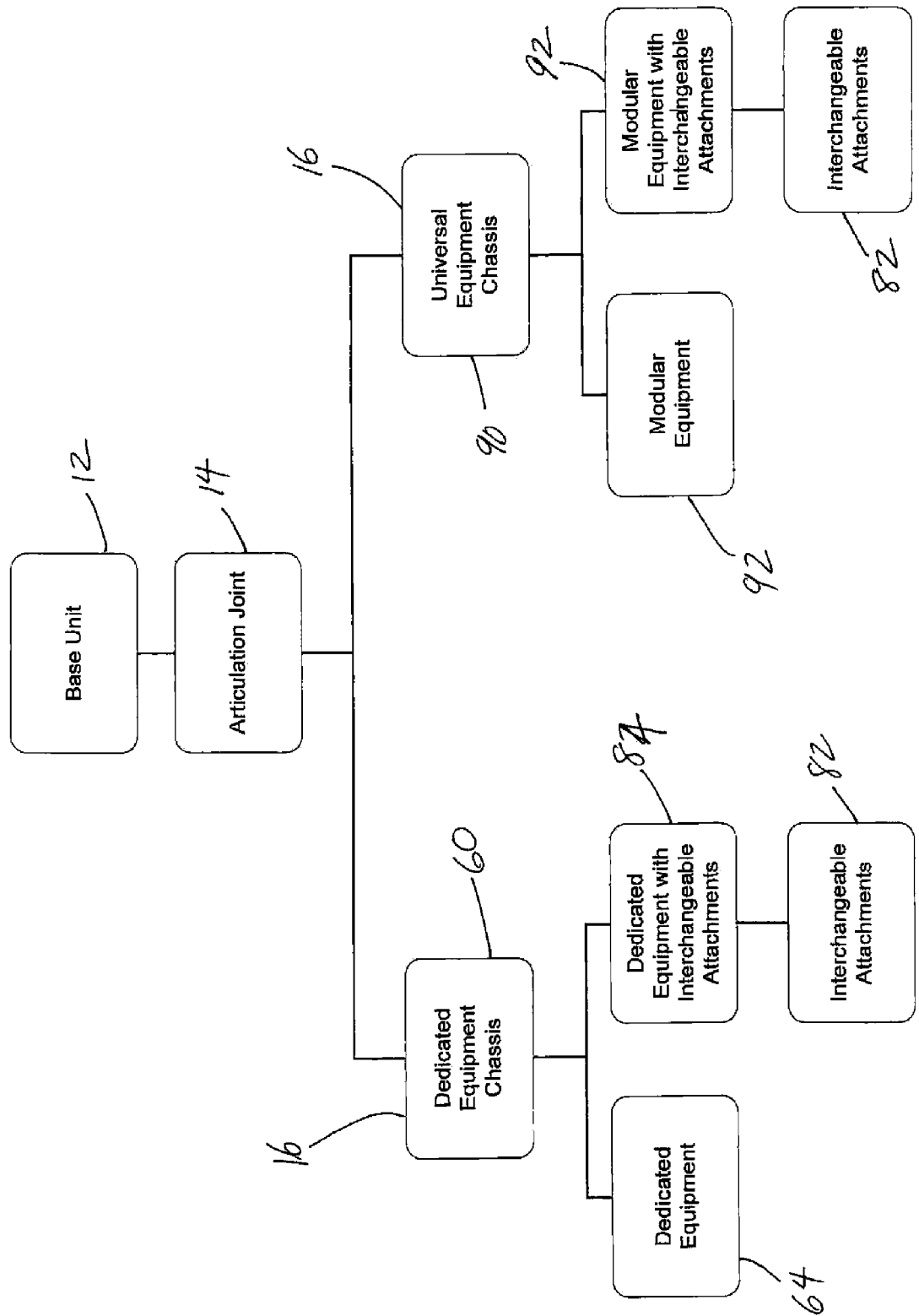
FIG. 5 is a flow chart of various embodiments of a tool carrier in accordance with the present invention.

Turning now to FIG. 5, various configurations of the tool carrier 10 are shown in flow chart form, describing the interchangeable embodiments of the present invention. As disclosed above, the tool carrier 10 comprises a base unit 12, an articulation joint 14, and one of a plurality of equipment chassis 16. FIG. 5 shows a breakdown of the possible configurations of the chassis 16. In one embodiment, the chassis is a dedicated equipment chassis 60. The dedicated equipment chassis 60 is preferably fastened onto the articulation joint 14. Alternatively, the dedicated equipment chassis 60 can be adapted for quick attachment to the articulation joint 14 or be made integral with the articulation joint.

Turning again to FIG. 2, an exemplary embodiment of the dedicated equipment chassis 60 is illustrated. The dedicated equipment chassis 60 comprises at least one ground supporting member 40, a power receptor 62, such as a hydraulic motor, and dedicated equipment 66, shown herein as a trencher assembly 44. The power receptor 62 is connectable to the base unit power connection 5$ and adapted to supply power to the dedicated equipment chassis 60. The dedicated equipment 66 can be various work tool configurations such as a trencher, vibratory plow, a cutter wheel, a mower, an excavator, etc. FIG. 2 shows a dedicated equipment chassis 60 comprising a trencher assembly 44 with a single trail wheel 40 and an auger 68. The trencher assembly 44 comprises a trenching chain boom 70 and a digging chain 72.

The trenching assembly 44 is pivotally movable about a horizontal axis with a hydraulic cylinder 74. The digging chain 72 is rotatably connected about the trenching chain boom 70 and driven by the hydraulic motor 62. When operating as a trencher, the tool carrier 10 traditionally travels in the direction of the base, effectively following the base unit 12. In operation, the trenching chain boom 70 is pivoted by the cylinder 74 towards the ground in which a trench will be created. The rotation of the digging chain 72 causes displaced soil to accumulate near the vehicle 10. The auger 68 provides a means for removing the dirt to the side(s) of the chassis 60 to keep it from impeding the progress of the tool carrier 10 as the trench is created. The auger 68 also keeps the dirt from falling back into the trench.

In the prior art, compact trenchers without steering means are positioned and redirected using physical force. In the present invention, the articulation joint 14 provides the vehicle 10 with maneuverability while mobiling, increasing the ease of operation and decreasing both the amount of time required and the amount of surface damage.

Figure 6:
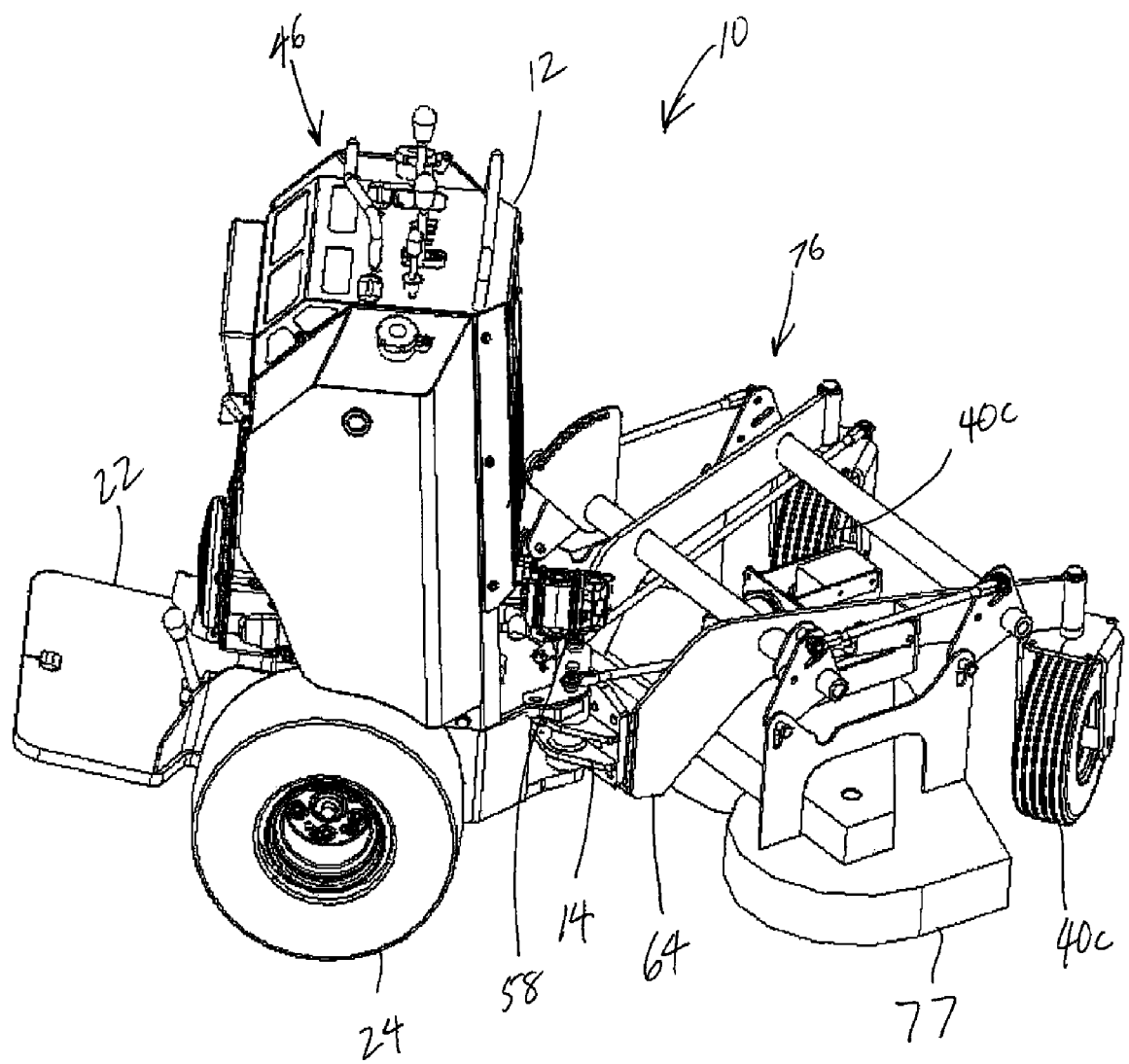
FIG. 6 is a perspective view of a tool carrier having a dedicated mower attachment.

FIG. 6 shows an embodiment of the present invention's configuration, wherein the dedicated equipment 66 comprises a mower assembly 76. As shown, the mower assembly 76 is attached to the base unit 12 at the articulation joint 14. The mower assembly 76 comprises mower blades (not shown), a mower deck 77, and ground support members 40c. Preferably, the ground supporting members 40c are trolley wheels. The trolley wheels 40c may be either free floating or operate in coordination with the articulated steering. More preferably, the trolley wheels 40c are used to support and control the height of the mower deck 77. The mower blades are powered through the base unit power connection 58 with the hydraulic motor receiving power from the base unit 12.

Figure 7:
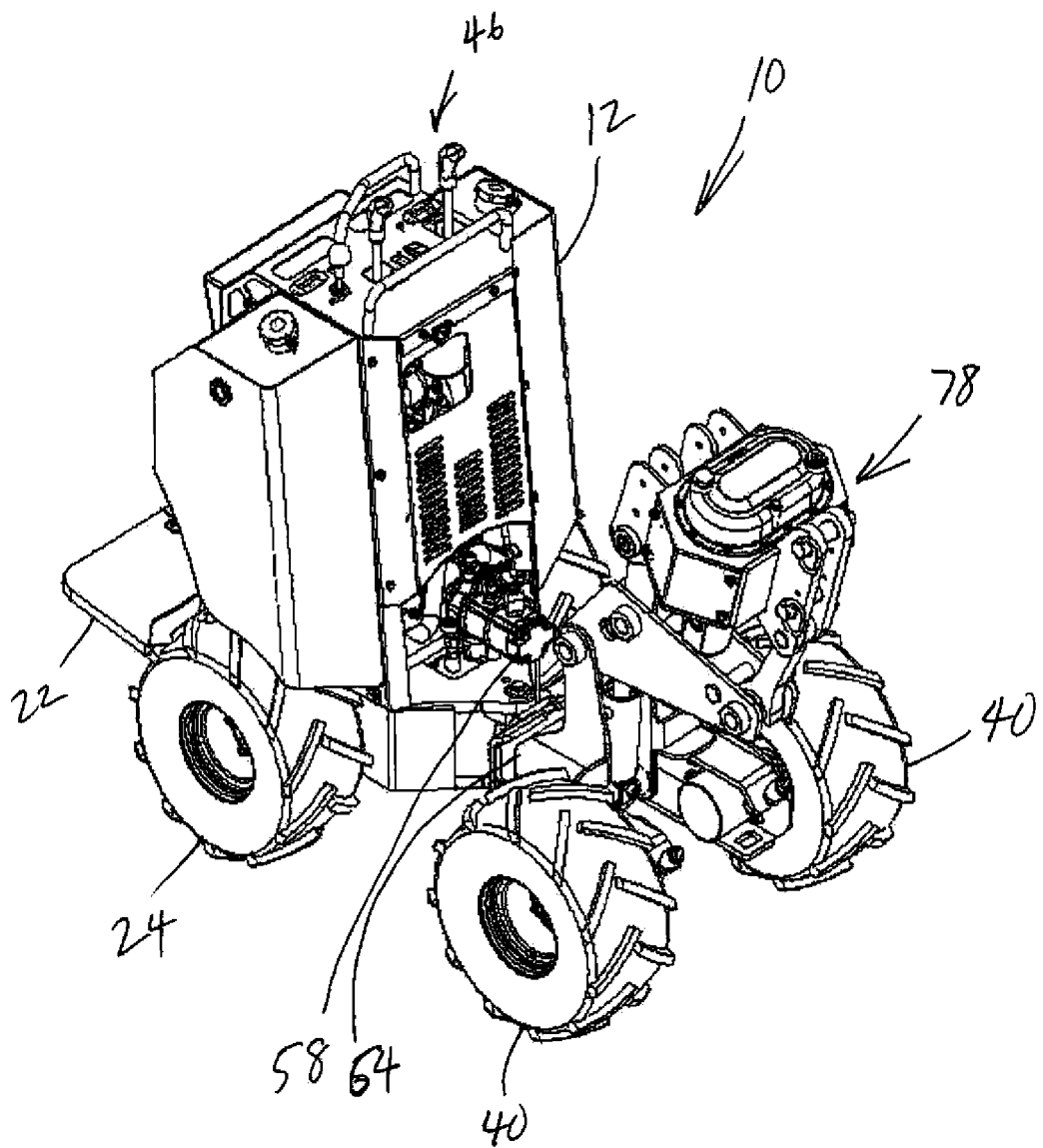
FIG. 7 is a perspective view of a tool carrier having a dedicated vibratory plow attachment.

With reference now to FIG. 7, shown therein is another embodiment of the present invention's configuration, with the dedicated equipment 66 shown comprising a vibratory plow assembly 78. In this configuration, the dedicated equipment chassis 60 has two wheels 40. The two wheels 40 may be non-powered or alternatively may receive power from the power connection 58 giving the tool carrier 10 four-wheel drive capabilities.

Figure 8:
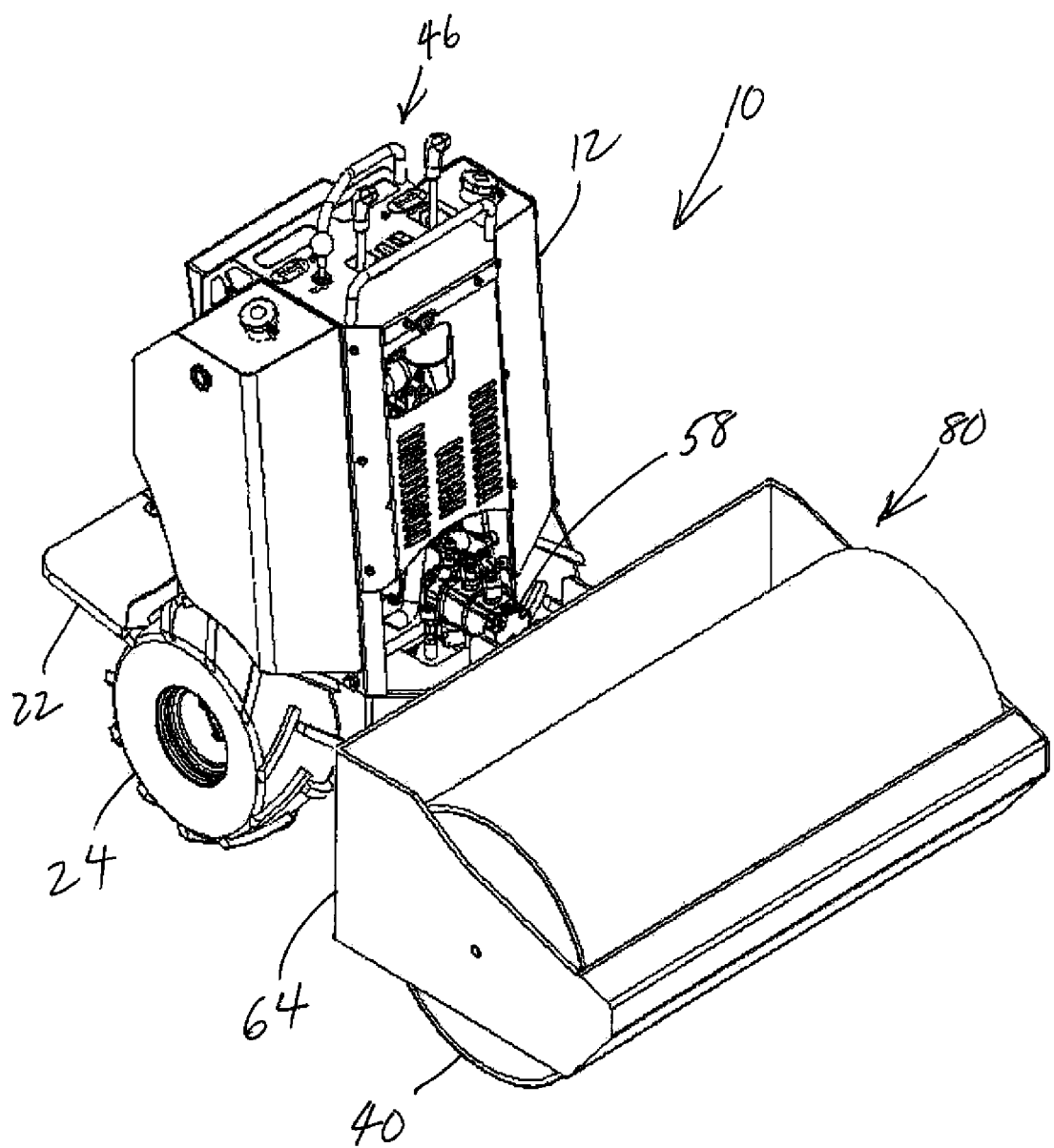
FIG. 8 is a perspective view of a tool carrier having a dedicated compacting roller attachment.

Referring now to FIG. 8, shown is an embodiment of the present invention wherein the dedicated equipment 66 is a compacting roller 80. In this configuration, the attachment has the function of both the dedicated equipment 66 and the ground support member 40. The roller 80 can either be non-vibrating or vibrating, rotationally driven or free rolling.

Figure 9:
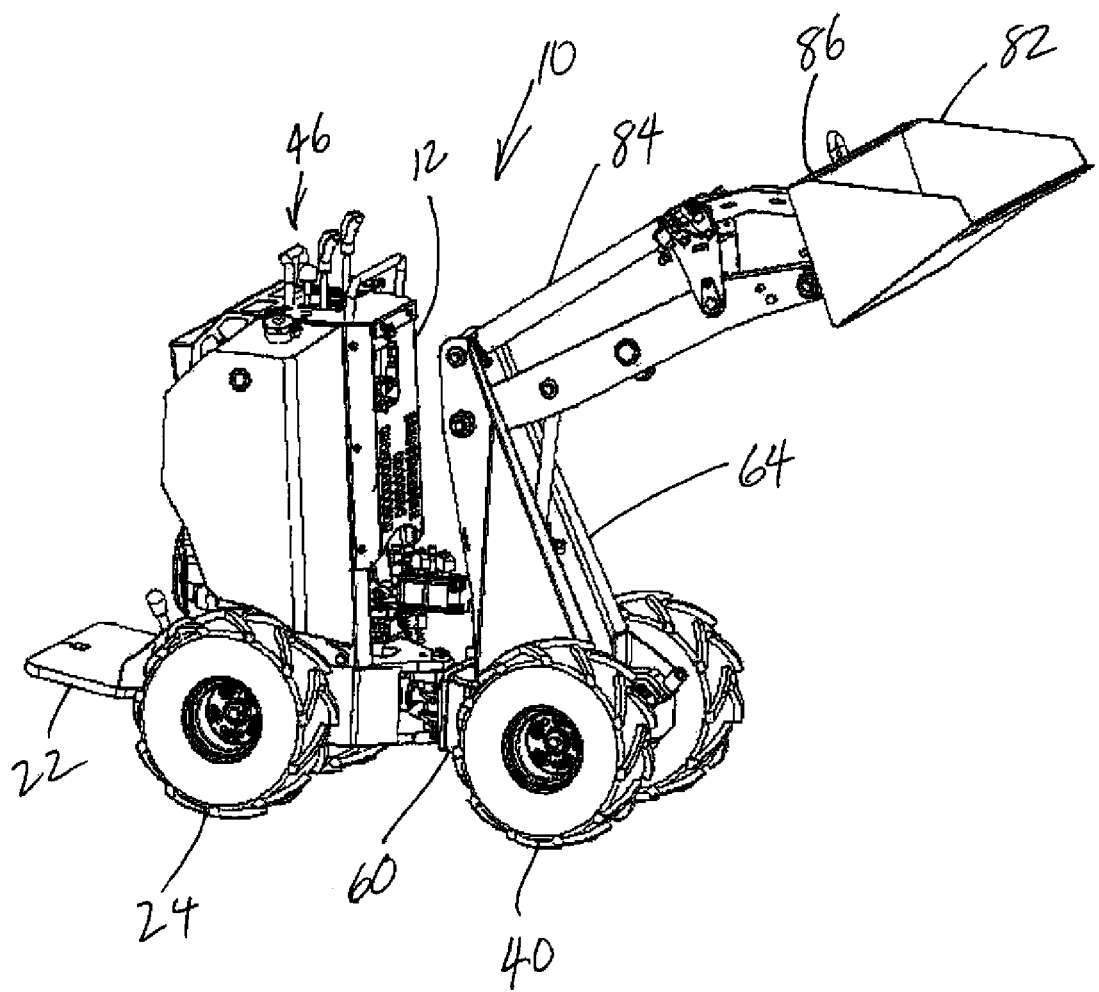
FIG. 9 is a perspective view of a tool carrier having a dedicated lift arm attachment adapted to receive interchangeable equipment.

Turning again to FIG. 5, in another alternative embodiment, the dedicated equipment chassis 60 may be adapted for connection to an interchangeable attachment 82. One possible embodiment of this invention is shown in FIG. 9. As shown therein, the dedicated equipment chassis 60 comprises at least one ground support member 40, power receptors 62 (shown are hydraulic motors), and dedicated equipment 66 for use with interchangeable attachments 82. FIG. 9 shows a dedicated equipment chassis 60 comprising dedicated equipment 66 in the form of a tower arm 84. The tower arm 84 may comprise one or more movable lift arms with a moveable interchangeable attachment mounting plate 86 at its distal end. Any attachment 82, such as pallet forks, a bucket, rotary broom, tiller, jackhammer, trencher or any other attachment with the capability for mounting can attach to this plate 86. The attachment 82 can be non-powered or powered. As shown, the attachment 82 is a bucket 88.

Figure 10:
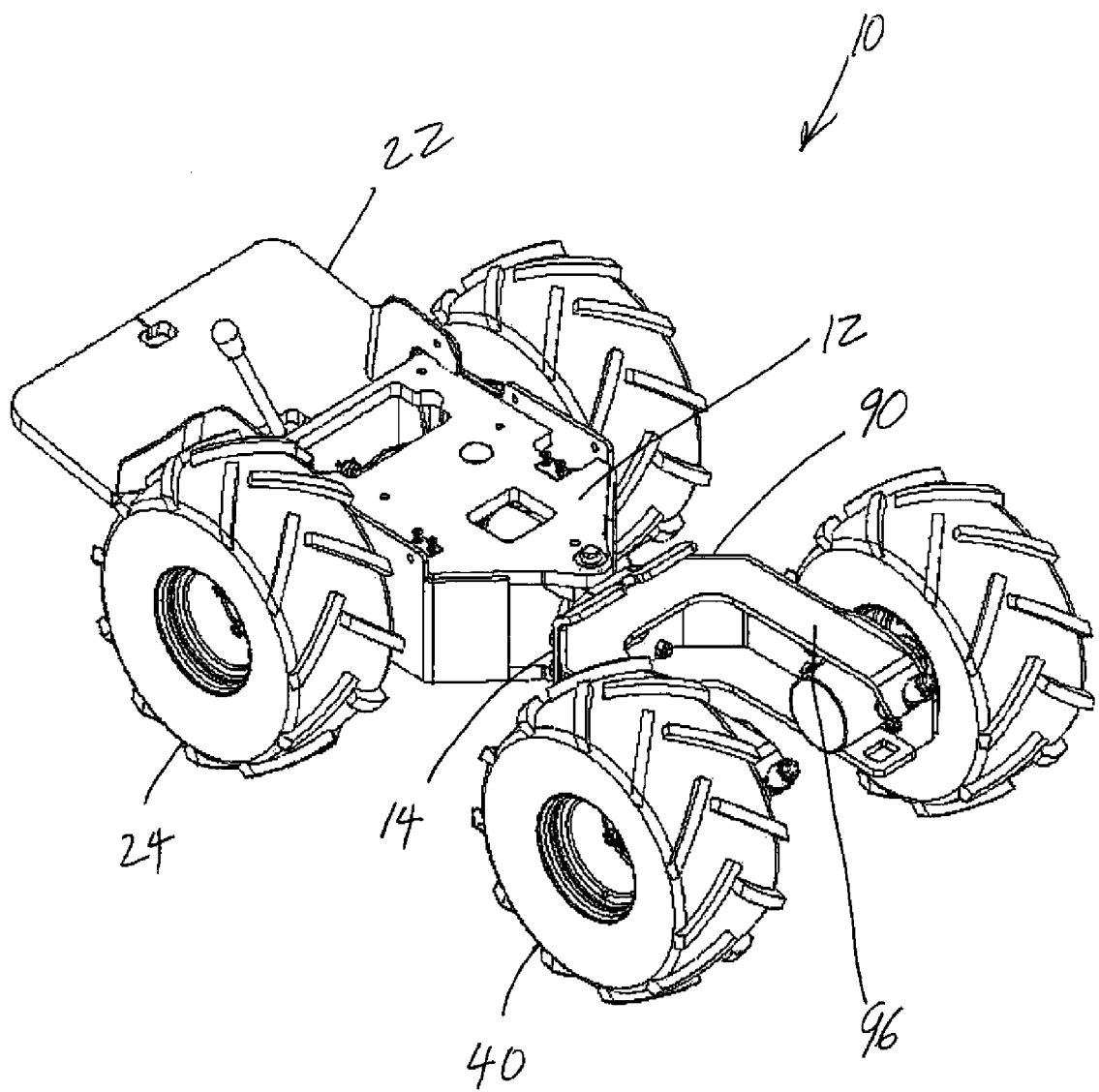
FIG. 10 is a cut-away perspective view of a tool carrier having a base unit, an articulation joint, and one of a plurality of universal chassis.

With reference again to FIG. 5, an alternative configuration for the machine 10 is shown. In this embodiment, the equipment chassis 16 comprises a universal equipment chassis 90. The universal equipment chassis 90 may be fastened to the articulation joint 14, connected by a quick attach apparatus, or made integral with the articulation joint. The universal equipment chassis 90 may be attached to integrated modular equipment 92. Alternatively, the universal equipment chassis 90 may be attached to modular equipment 92 adapted for connection to interchangeable attachments 82. One basic structure of this embodiment of this invention is shown in FIG. 10. The universal equipment chassis 90 comprises at least one ground support member 40 and an attachment surface 96. Preferably, the attachment surface 96 is an upper surface of the universal chassis 90 and provides a generally horizontal connection point. The attachment means at surface 96 may comprise either a quick attachment or use of conventional fasteners.

Figure 11:
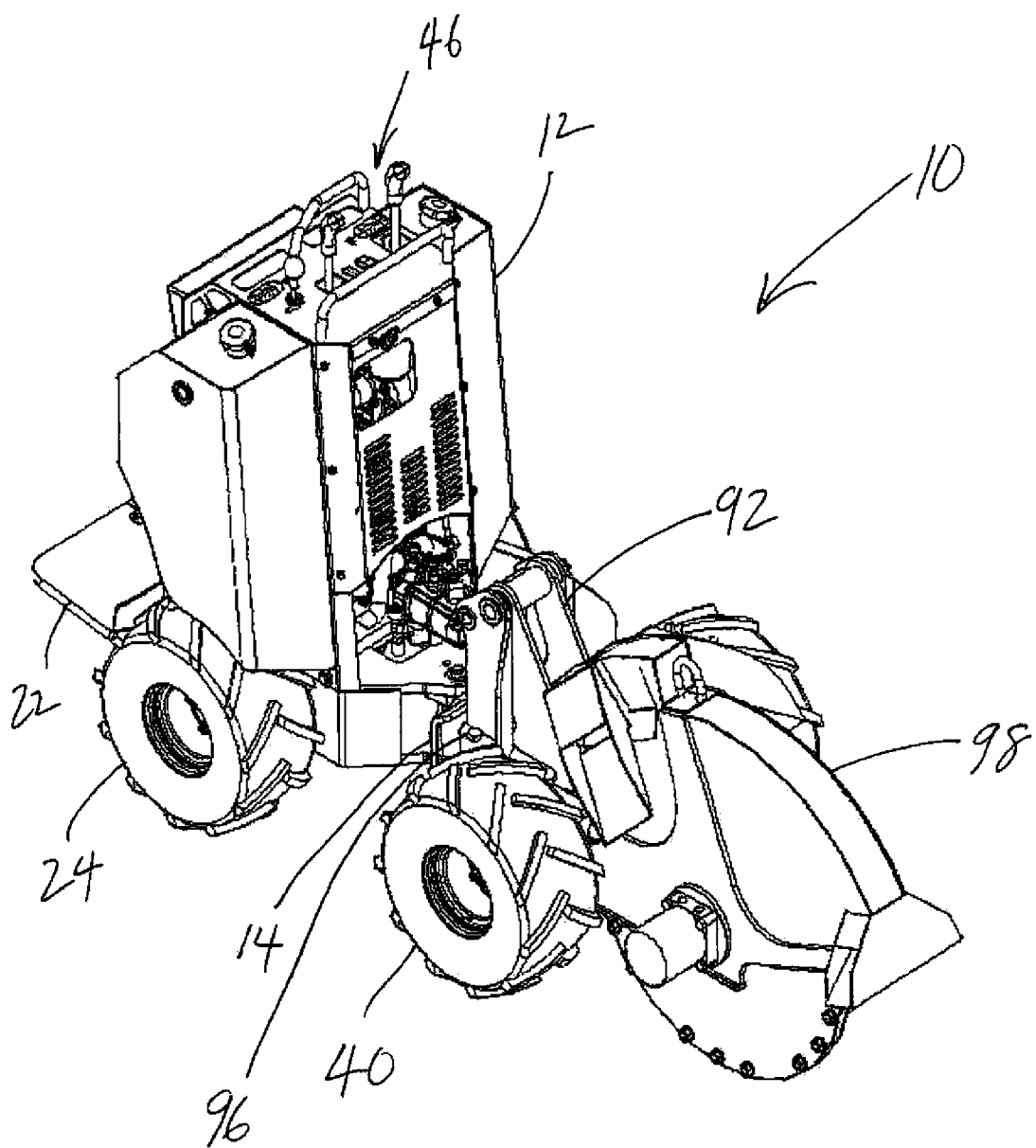
FIG. 11 is a perspective view of a tool carrier with a universal equipment chassis and an attached cutter wheel.

As shown in FIG. 11, the attachment surface 96 may be adapted to provide attachment to a plurality of modular equipment 92. In FIG. 11, the modular equipment 92 comprises a cutter wheel 98. The cutter wheel 98 is attached to the universal equipment chassis by means of the attachment surface 96. This embodiment is flexible enough to alternatively comprise different individual modular equipment 92 such as a dump box, a vibratory plow, an excavator, or a trencher. Depending upon the type of modular equipment 92 utilized, the equipment could have ground support members 100 of its own in addition to that of the equipment chassis 90. These additional members 100 could either be powered or non-powered.

Figure 12:
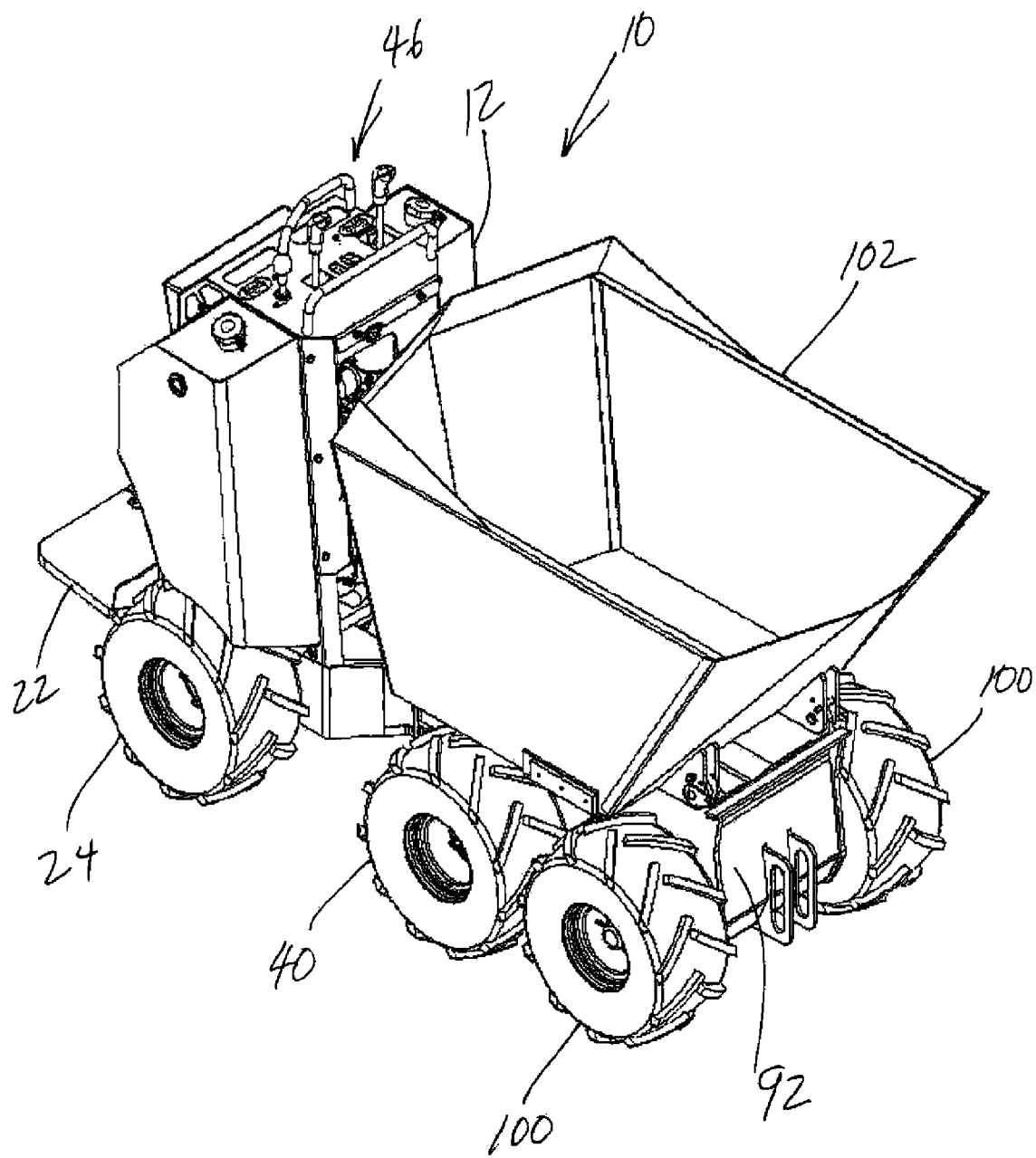
FIG. 12 is a perspective view of a tool carrier with a universal equipment chassis and an attached dump box.

As shown in FIG. 12, the modular equipment 92 comprises a dump box 102. The modular equipment 92 comprises its own additional ground support members 100. As shown, the additional support members 100 are a part of the modular equipment 92 that fastens to the universal equipment chassis 90 resulting in six ground support members 24, 40, and 100 for the vehicle 10. Alternatively, said ground support members 24, 40 and 100 could comprise a hydraulically driven track or tracks.

Figure 13:
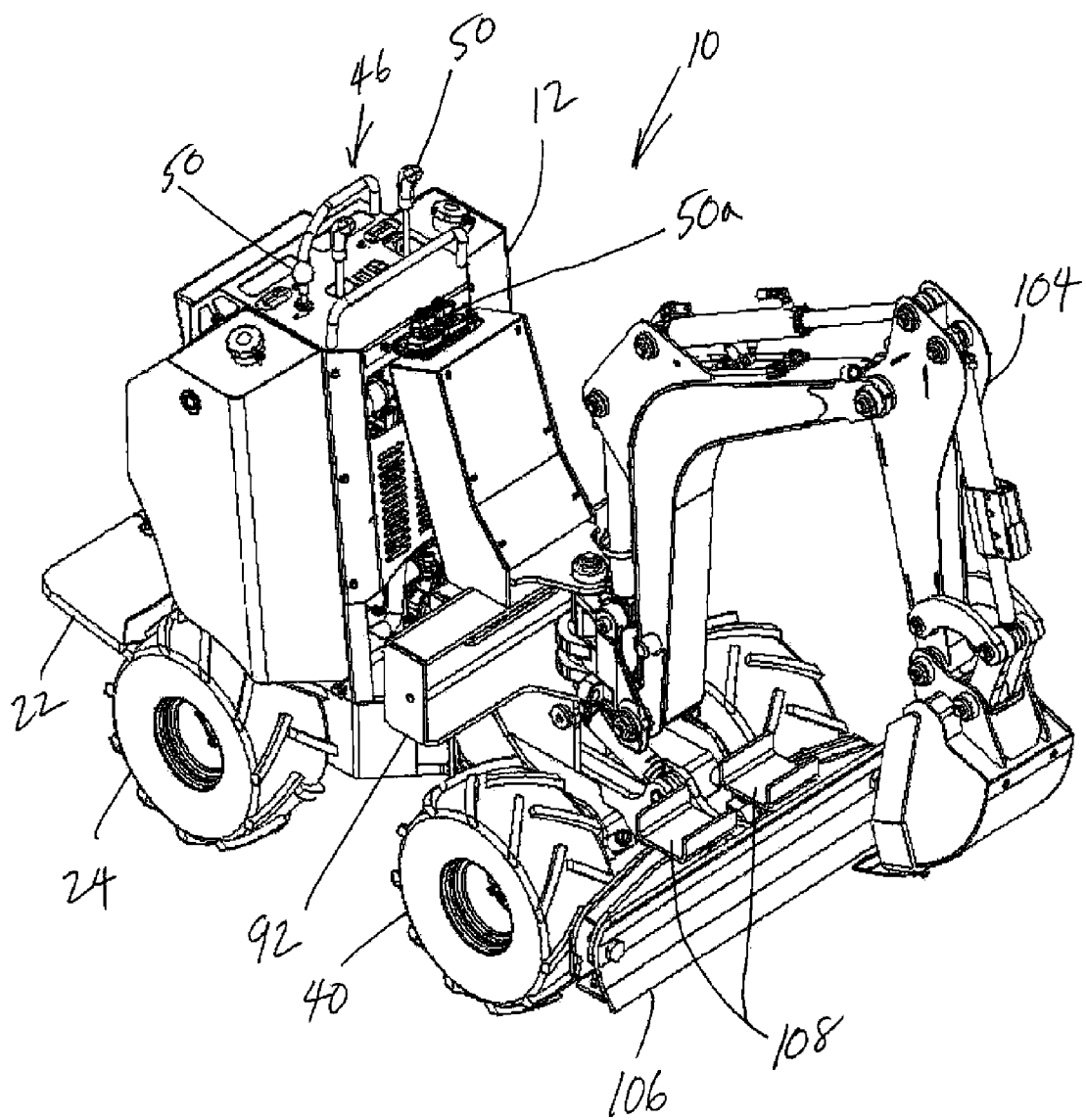
FIG. 13 is a perspective view of a tool carrier with a universal equipment chassis and an attached excavator.

FIG. 13 shows an alternative embodiment of modular equipment 92 mounted to the universal equipment chassis 90. In this embodiment, the modular equipment 92 comprises an excavator 104 and a push blade 106. The use of articulated steering in conjunction with swing movement of the excavator 104 increases the extent of the working area without requiring repositioning of the tool carrier 10. The push blade 106 is adapted to push loose material, such as earth, and serves as a stabilizing device during operation of the excavator 104. As shown, the push blade 106 comprises stabilizers 108 to provide additional stabilizing effect. The stabilizers 108 fold down and extend from the push blade 106 to engage the surface. Additional stabilizers can be added to the base unit 12 for increased stabilization.

As shown in FIG. 13, the modular equipment 92 comprises additional controls 50a due to the multiple controls required for operation of this type of work tool. The control function may alternatively be accomplished using a combination of controls 50 on the base unit 12 and controls 50*a* on the modular equipment 92.

Figure 14:
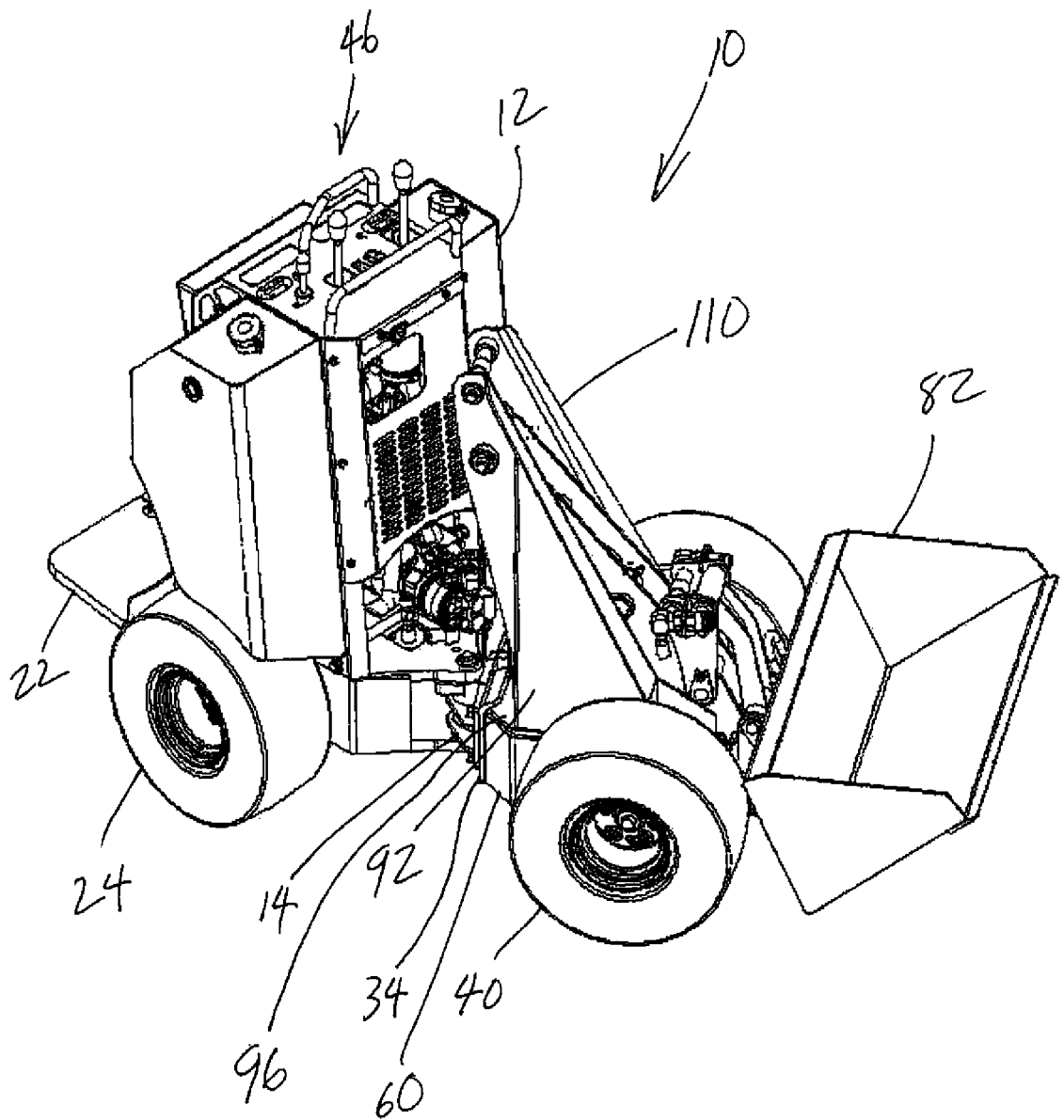
FIG. 14 is a perspective view of a tool carrier with a universal equipment chassis and an attached lift arm adapted for use with interchangeable attachments.

Turning to FIG. 14, the modular equipment 92 may be adapted for use with a plurality of attachments 82. In one particularly useful embodiment, the modular equipment 92 is shown as a tower 10 with lift arms. As discussed before, the attachment 82 may be any of a plurality of attachments, including a pallet fork, rotary broom, bucket, etc. Shown in FIG. 14 is a bucket. As one skilled in the art will appreciate, this particular embodiment allows the tool carrier 10 three potential places of modification: at attachment plate 34 of the articulation joint 14 by the replacement of the chassis 16 with a different dedicated chassis 60 or universal chassis 90, at the attachment surface 96 by replacement of the modular equipment 92 with another piece of modular equipment, or by replacing the attachment 82 on the current modular equipment 92.

Various modifications can be made in the design and operation of the present invention without departing from the spirit thereof. For example, certain work tools or accessories could be attached to the base unit 12 thus providing a work tool on both ends of the tool carrier 10. Additionally the equipment as described herein could be a combination of work tools. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. An articulated work vehicle, comprising:
   a base unit, having a front end and a back end, the base unit comprising a power unit adapted to power the work vehicle, and at least one ground drive member powered by the power unit and adapted to provide mobility to the work vehicle;
   an operator station, extending from the back end of the base unit, the operator station adapted to allow operation of the vehicle while walking behind or standing on the vehicle;
   an articulation joint comprising a work attachment plate and a pivot attachment, the pivot attachment operatively connected to the front end of the base unit such that the articulation joint is pivotally connected to the base unit about a substantially vertical axis to the base unit; and
   an equipment chassis, removably attachable to the work attachment plate of the articulation joint comprising at least one ground support member, adapted to provide mobility and support to the equipment chassis and the base unit.

2. The vehicle of claim 1, wherein each of the ground drive members are wheels.

3. The vehicle of claim 1, wherein the attachment plate is adapted for quick attachment to the equipment chassis.

4. The vehicle of claim 1, wherein the equipment chassis comprises a vibratory plow.

5. The vehicle of claim 1, wherein the equipment chassis comprises a trencher.

6. The vehicle of claim 1, wherein the equipment chassis comprises an excavator.

7. The vehicle of claim 1, further comprising a work tool attachable to the equipment chassis.

8. The vehicle of claim 7, wherein the work tool comprises a trencher assembly.

9. The vehicle of claim 1, further comprising a plurality of drive motors, wherein each of the ground drive members of the base unit are powered by one of the motors.

10. The vehicle of claim 1, wherein at least one of the ground support members of the equipment chassis is drivably coupled to the power unit.

11. The vehicle of claim 1, wherein the chassis is powered by the base unit and controlled at the operator station.

12. A base unit adapted for connection to an equipment chassis, wherein the equipment chassis comprises at least one ground support member adapted to provide mobility and support to the base unit and the equipment chassis, the base unit comprising:
   a stand-on operating platform, extending from a first end of the base unit,
   at least one ground drive member, adapted to provide support and mobility to the base unit;
   an articulation joint, comprising a work attachment plate and a pivot attachment, the pivot attachment operatively connected to a second end of the base unit such that the articulation joint is pivotally connected about a substantially vertical axis to the base unit, the work attachment plate adapted for attachment to the equipment chassis.

\* \* \* \* \*